United States Patent Office.

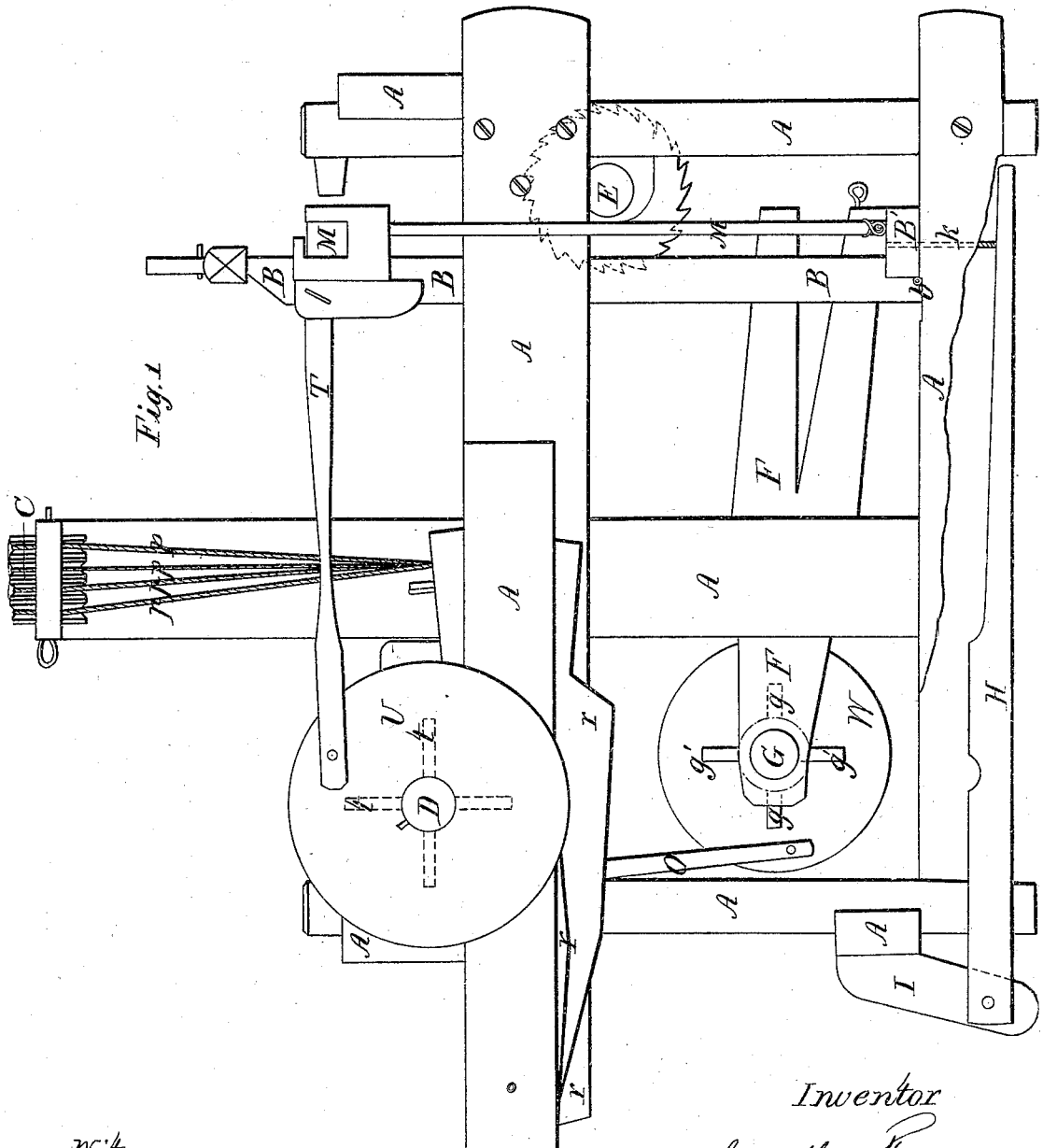

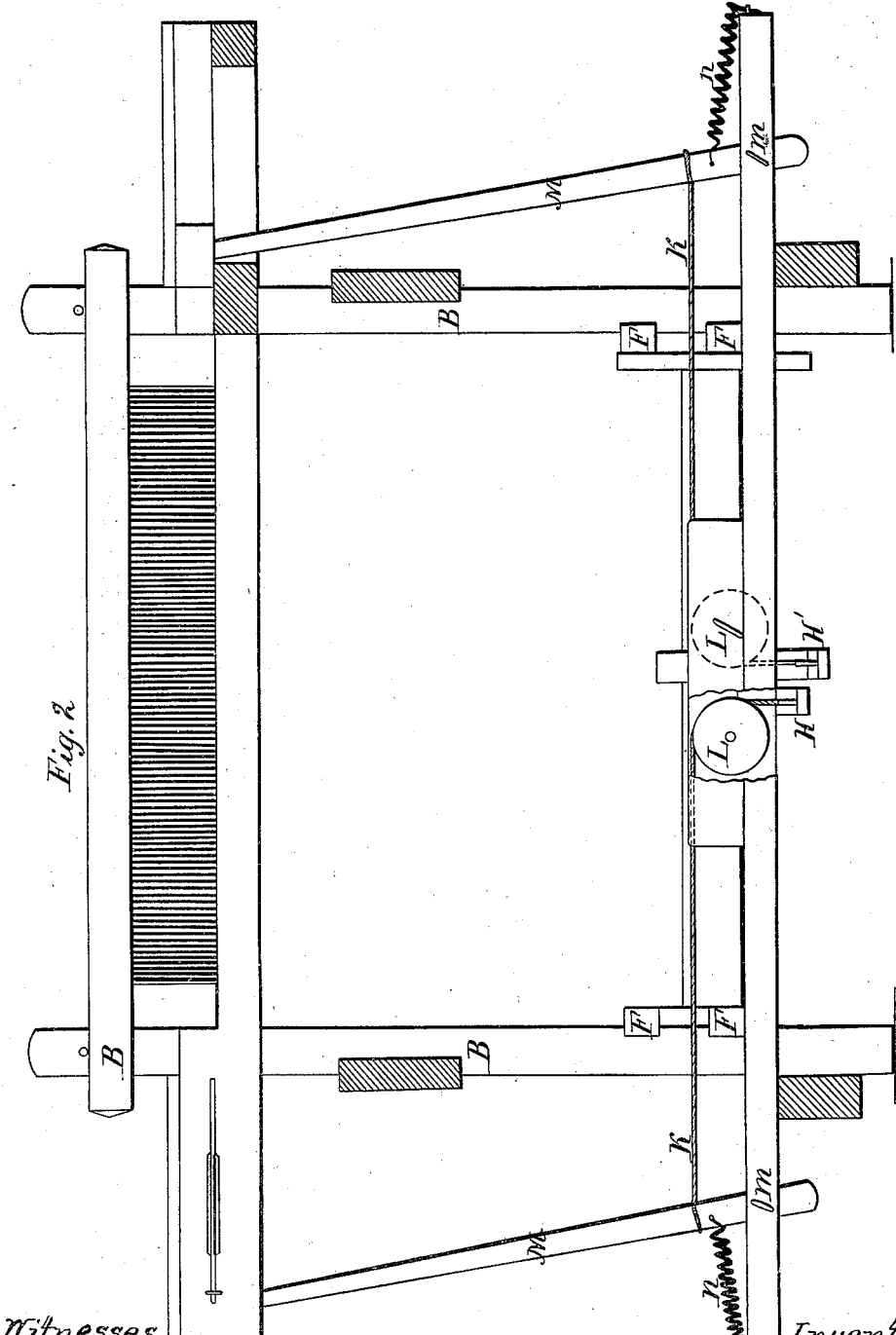

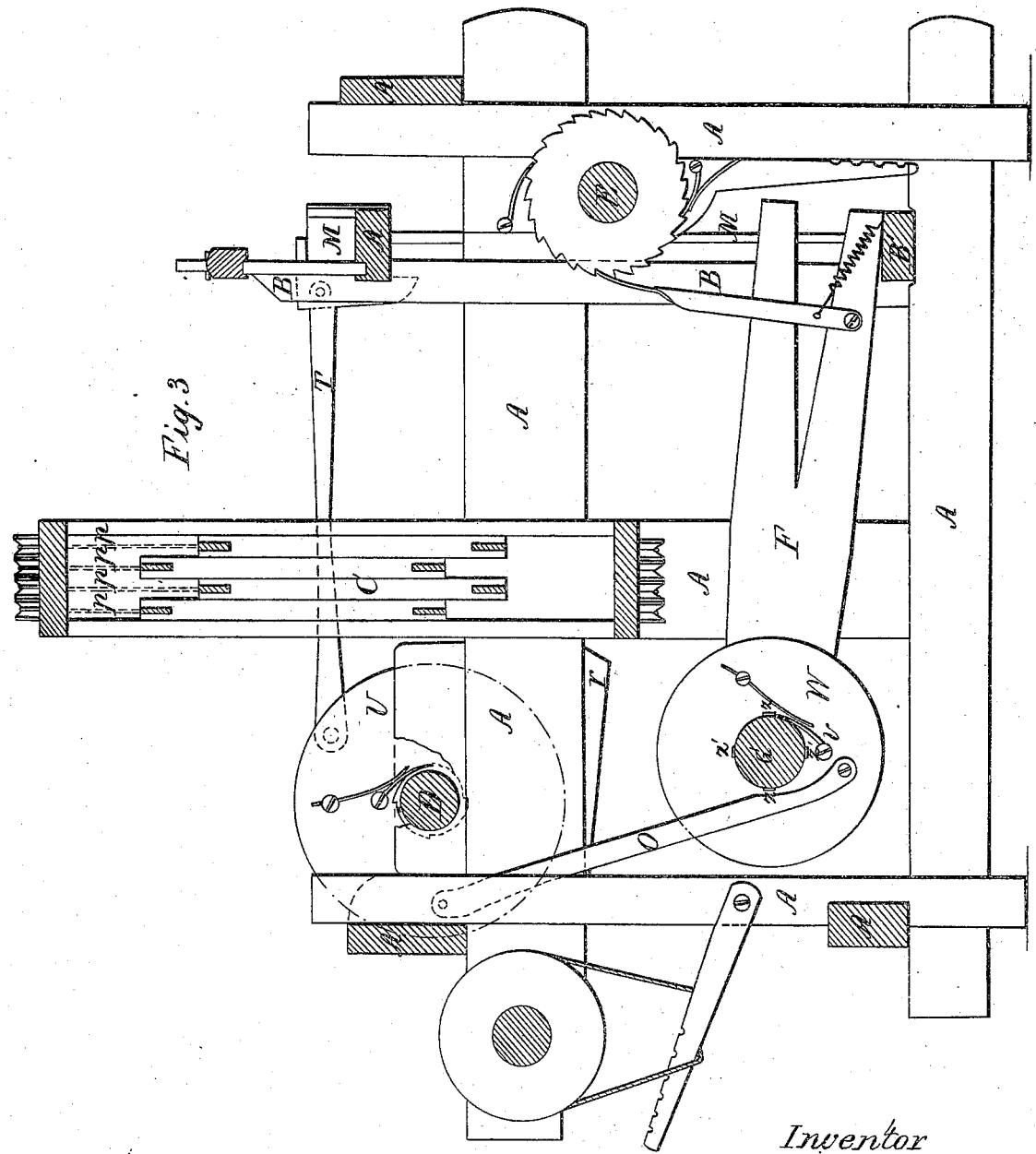

G. W. FIRESTONE, OF FREDERICKSBURG, OHIO.

Letters Patent No. 70,186, dated October 29, 1867.

---

IMPROVEMENT IN HAND-LOOM.

---

*The Schedule referred to in these Letters Patent and making part of the same.*

---

TO ALL WHOM IT MAY CONCERN:

Be it known that I, G. W. FIRESTONE, of Fredericksburg, in the county of Wayne, and State of Ohio, have invented a new and useful Improvement in Looms; and I do hereby declare the following to be a full, clear, and exact description of the same, reference being had to the accompanying drawing, forming part of this specification, and in which—

Figure 1 represents a side elevation of my invention.

Figure 2 is a front elevation of the same, showing the lathe, pick-staves, and treadles.

Figure 3 shows the means used for revolving the shaft G.

Similar letters of reference indicate corresponding parts in the several figures.

In this invention the oscillation of the lathe works the shuttles by means of the mechanism hereinafter explained. In the drawings—

A A represent different parts of the frame of the loom, of which B is the lathe, C the harness, D the shaft that operates the harness, and E the cloth-beam. The upper parts of the lathe are firmly fixed to the oscillating-beam B', which moves upon hinges $b\ b$ attached to the frame A. Firmly attached to the upright standards of the lathe and to the oscillating-beam B' are two sweeps F F, extending back towards the rear end of the loom, which being fixed at right angles with the lathe oscillate vertically while the latter is moving backward and forward in the operation of weaving. At their rear extremity the sweeps F F support a shaft, G, situated almost directly under the shaft D, and turning in its bearings. Just to the right of its centre, the shaft G is provided with two cams or arms $g\ g$, and just to the left of its centre with two more cams $g'\ g'$, the arms $g\ g$ extending at right angles to the arms $g'\ g'$, the arms $g\ g$ being situated directly over one treadle H, while the arms $g'\ g'$ are situated over the other treadle H'. The treadles H H' are situated under the loom, extending horizontally from arms I I, attached to the rear of the frame A, upon which they pivot to a point under the oscillating-beam B', where cords K K are fastened to them, and pass over pulleys L L in the beam B' to the picker-staves M M, to the lower part of which they are tied. The picker-staves M oscillate upon pins $m\ m$ in slots in the beam B'. The spiral springs $n\ n$ serve to keep the picker-staves extended when not drawn in by the depression of one of the treadles H H'. The shaft G is turned a quarter round, every time the lathe is moved back and forth, by the operation of a pawl, $v$, upon a truck, W, at its end working in four ratchet-teeth $z\ z$ on the shaft, the truck keing kept in the proper position by being jointed to a sweep, O. The latter is jointed at its upper extremity to the frame A.

The operation of a loom thus constructed is as follows: The shaft G is alternately raised and depressed with the sweeps F F to which it is attached, at every movement of the lathe B back and forth. At every downward movement of the shaft G, one of the pins $g\ g'$ strikes the treadle under it, depressing it, and by the operation of the cord K and pulley L, forcing the picker-staff rapidly inward so as to throw the fly-shuttle across the loom on the race-board. As the shaft G is, by the means above described, turned a quarter round every time it is elevated and depressed, it follows that the pins $g$ and $g'$ will alternately strike the treadles, and as the pins $g\ g$ operate upon one treadle and the pins $g'\ g'$ operate only on the other, it follows that the revolution of the shaft G will alternately depress the treadle H and the treadle H', forcing the shuttle along the race-board, first to the right and then to the left, as long as the machine is working.

It is not necessary for me to describe particularly the operation of the harness, as I claim nothing upon that part of my loom. The treadles are operated by ropes $p\ p$ attached to levers $r\ r\ r$, operated alternately by pins $t\ t$ on the shaft D. The necessary revolution of the shaft D is produced by the arm T, which communicates motion from the lathe to the truck U whence it is communicated to the shaft D by a ratchet and pawl, similar to those on the shaft G and truck W, above described. Thus all the operations of the different parts of my loom, except that of taking up the cloth, are produced in the most perfect manner by the simple oscillation of the lathe B.

Having thus described my invention, what I claim as new, and desire to secure by Letters Patent, is—

The combination of the lathe B with the sweeps F F, shaft G, treadles H, cords K K, and pick-staves M M, substantially as and for the purpose specified.

G. W. FIRESTONE.

Witnesses:
J. F. SCOTT,
JAMES B. TAYLOR.